US011551383B2

United States Patent
Yokota

(10) Patent No.: US 11,551,383 B2
(45) Date of Patent: Jan. 10, 2023

(54) IMAGE GENERATING APPARATUS, IMAGE GENERATING METHOD, AND PROGRAM FOR GENERATING AN IMAGE USING PIXEL VALUES STORED IN ADVANCE

(71) Applicant: Sony Interactive Entertainment Inc., Tokyo (JP)

(72) Inventor: Kenichiro Yokota, Tokyo (JP)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

(21) Appl. No.: 17/267,236

(22) PCT Filed: Aug. 15, 2019

(86) PCT No.: PCT/JP2019/032038
§ 371 (c)(1),
(2) Date: Feb. 9, 2021

(87) PCT Pub. No.: WO2020/036214
PCT Pub. Date: Feb. 20, 2020

(65) Prior Publication Data
US 2021/0233292 A1 Jul. 29, 2021

(30) Foreign Application Priority Data

Aug. 17, 2018 (JP) .............................. JP2018-153493

(51) Int. Cl.
*G06T 11/00* (2006.01)
*G02B 27/01* (2006.01)
*G06T 15/00* (2011.01)

(52) U.S. Cl.
CPC ........ *G06T 11/001* (2013.01); *G02B 27/0172* (2013.01); *G06T 15/005* (2013.01); *G02B 2027/014* (2013.01)

(58) Field of Classification Search
None
See application file for complete search history.

(56) References Cited

U.S. PATENT DOCUMENTS 5,008,838 A * 4/1991 Kelleher ............... G06T 15/405
345/422
6,011,566 A * 1/2000 Salamon ................. G06T 1/60
345/600

(Continued)

FOREIGN PATENT DOCUMENTS

JP 7240845 A 9/1995
JP 10288980 A 10/1998
JP 2013187595 A 9/2013

OTHER PUBLICATIONS

International Search Report for corresponding PCT Application No. PCT/JP2019/032038, 2 pages, dated Oct. 15, 2019.

(Continued)

*Primary Examiner* — Jason A Pringle-Parker
(74) *Attorney, Agent, or Firm* — Matthew B. Dernier, Esq.

(57) ABSTRACT

Provided are an image generating apparatus, an image generating method, and a program that are capable of saving the storage capacity of a frame buffer for storing pixel values of pixels determined in advance to have a predetermined value as their pixel values. An acquisition management data storing unit stores acquisition management data. A pixel value storing unit stores a pixel value of a pixel determined to have a pixel value acquired from the pixel value storing unit. An acquisition determining unit determines, based on the acquisition management data, whether or not to acquire a pixel value of each of pixels from the pixel value storing unit. A pixel value determining unit determines, with regard to the pixel determined to have the pixel value acquired from the pixel value storing unit, a pixel value acquired from the (Continued)

pixel value storing unit as the pixel value of the pixel. The pixel value determining unit determines, with regard to a pixel determined to have a pixel value not acquired from the pixel value storing unit, a predetermined value as the pixel value of the pixel.

6 Claims, 6 Drawing Sheets

(56) References Cited

U.S. PATENT DOCUMENTS

| | | | | |
|---|---|---|---|---|
| 6,198,835 | B1* | 3/2001 | Banton | H04N 1/0005 |
| | | | | 358/464 |
| 6,928,196 | B1* | 8/2005 | Bradley | G06T 3/403 |
| | | | | 382/199 |
| 10,127,632 | B1* | 11/2018 | Burke | G06T 3/4038 |
| 10,762,702 | B1* | 9/2020 | Dhua | G06T 19/006 |
| 2006/0210191 | A1* | 9/2006 | Silverstein | G06T 5/005 |
| | | | | 382/275 |
| 2007/0188506 | A1* | 8/2007 | Hollevoet | G09G 5/39 |
| | | | | 345/530 |
| 2014/0037206 | A1* | 2/2014 | Newton | H04N 19/61 |
| | | | | 382/166 |
| 2015/0379734 | A1* | 12/2015 | Golas | G06T 7/337 |
| | | | | 345/597 |
| 2017/0161863 | A1* | 6/2017 | Baral | G06T 15/80 |
| 2017/0161905 | A1* | 6/2017 | Reyzin | G06T 7/194 |

OTHER PUBLICATIONS

International Preliminary Report on Patentability and Written Opinion for corresponding PCT Application No. PCT/JP2019/032038, 13 pages, dated Mar. 4, 2021.

* cited by examiner

IMAGE GENERATING APPARATUS, IMAGE GENERATING METHOD, AND PROGRAM FOR GENERATING AN IMAGE USING PIXEL VALUES STORED IN ADVANCE

TECHNICAL FIELD

The present invention relates to an image generating apparatus, an image generating method, and a program.

BACKGROUND ART

Superimposed images in each of which a background image representing a situation in a game being played and a foreground image representing a user interface in the game with two-dimensional objects such as characters, shapes, or symbols are superimposed on each other are generated at a predetermined frame rate to be drawn in a frame buffer in some cases.

Further, to achieve stereopsis by a head mounted display including an optical system, a rectangular three-dimensional image including a distortion-corrected left-eye image and a distortion-corrected right-eye image in the circular field-of-view range of the user's left eye and the circular field-of-view range of the user's right eye, respectively, is generated to be drawn in a frame buffer in some cases.

SUMMARY

Technical Problem

For example, in the above-mentioned foreground image, regions in which the two-dimensional objects are to be arranged are determined in advance by designers or the like, and it is determined in advance that a pixel value representing no color and full transparency is set to pixels outside the regions, in some cases.

Further, for example, in the above-mentioned rectangular three-dimensional image, it is determined in advance that a pixel value representing black is set to pixels outside the circular field-of-view ranges.

Here, for example, it is not necessary to secure, for the pixels determined in advance to have, as their pixel values, the predetermined value such as the pixel value representing no color and full transparency or the pixel value representing black, a storage capacity as large as those for other pixels in the frame buffer. For example, with regard to an image including pixels each of which needs a storage capacity of 32 bits for storage of its color and transparency, it is not necessary to secure, for pixels determined in advance to have a predetermined value as their pixel values, a storage capacity of 32 bits in the frame buffer.

The present invention has been made in view of the above-mentioned circumstances, and has an object to provide an image generating apparatus, an image generating method, and a program that are capable of saving the storage capacity of a frame buffer for storing the pixel values of pixels determined in advance to have a predetermined value as their pixel values.

Solution to Problem

In order to solve the above-mentioned problem, according to the present invention, there is provided an image generating apparatus including: a pixel value storing unit configured to store a pixel value; an acquisition management data storing unit configured to store acquisition management data indicating whether or not to acquire, from the pixel value storing unit, a pixel value of each of pixels included in an image; an acquisition determining unit configured to determine, based on the acquisition management data, whether or not to acquire the pixel value of each of the pixels from the pixel value storing unit; a pixel value acquiring unit configured to acquire, from the pixel value storing unit, a pixel value of a pixel determined to have a pixel value acquired from the pixel value storing unit; and a pixel value determining unit configured to determine the pixel value of each of the pixels. The pixel value storing unit stores the pixel value of the pixel determined to have the pixel value acquired from the pixel value storing unit. The pixel value determining unit determines, with regard to the pixel determined to have the pixel value acquired from the pixel value storing unit, a pixel value acquired from the pixel value storing unit as the pixel value of the pixel. The pixel value determining unit determines, with regard to a pixel determined to have a pixel value not acquired from the pixel value storing unit, a predetermined value as the pixel value of the pixel.

In one aspect of the present invention, the acquisition management data includes a plurality of pieces of individual acquisition management data each associated with a plurality of the pixels. The acquisition determining unit determines, based on the individual acquisition management data, whether or not to acquire pixel values of the plurality of pixels associated with the individual acquisition management data from the pixel value storing unit. The pixel value determining unit determines, with regard to all of a plurality of pixels that are associated with the individual acquisition management data and determined to have pixel values not acquired from the pixel value storing unit, a predetermined value as the pixel values of the plurality of pixels.

In the aspect, the individual acquisition management data may be associated with a plurality of pixels occupying a rectangular region in the image.

Further, in one aspect of the present invention, the pixel value storing unit stores a pixel value and an alpha value. The pixel value determining unit determines, with regard to the pixel determined to have the pixel value acquired from the pixel value storing unit, a pixel value and an alpha value acquired from the pixel value storing unit as a pixel value and an alpha value of the pixel. The pixel value determining unit determines, with regard to the pixel determined to have the pixel value not acquired from the pixel value storing unit, predetermined values as a pixel value and an alpha value of the pixel. The image generating apparatus further includes an image generating unit configured to generate a superimposed image by superimposing an image having the pixel value and the alpha value determined by the pixel value determining unit and another image on each other.

Further, in one aspect of the present invention, the acquisition management data indicates that a pixel value of a pixel occupying a given region in the image is not to be acquired from the pixel value storing unit.

Further, according to the present invention, there is provided an image generating method including: a pixel value storing step of storing a pixel value in a pixel value storing unit; an acquisition management data storing step of storing, in an acquisition management data storing unit, acquisition management data indicating whether or not to acquire a pixel value of each of pixels included in an image from the pixel value storing unit; an acquisition determining step of determining, based on the acquisition management data, whether or not to acquire the pixel value of each of the pixels from the pixel value storing unit; a pixel value acquiring step of acquiring, from the pixel value storing unit, a pixel value of a pixel determined to have a pixel value acquired from the pixel value storing unit; and a pixel value determining step of determining the pixel value of each of the pixels. In the pixel value storing step, the pixel value of the pixel determined to have the pixel value acquired from the pixel value storing unit is stored in the pixel value storing unit. In the pixel value determining step, with regard to the pixel determined to have the pixel value acquired from the pixel value storing unit, a pixel value acquired from the pixel value storing unit is determined as the pixel value of the pixel. In the pixel value determining step, with regard to a pixel determined to have a pixel value not acquired from the pixel value storing unit, a predetermined value is determined as the pixel value of the pixel.

Further, according to the present invention, there is provided a program for causing a computer to execute: a pixel value storing procedure of storing a pixel value in a pixel value storing unit; an acquisition management data storing procedure of storing, in an acquisition management data storing unit, acquisition management data indicating whether or not to acquire a pixel value of each of pixels included in an image from the pixel value storing unit; an acquisition determining procedure of determining, based on the acquisition management data, whether or not to acquire the pixel value of each of the pixels from the pixel value storing unit; a pixel value acquiring procedure of acquiring, from the pixel value storing unit, a pixel value of a pixel determined to have a pixel value acquired from the pixel value storing unit; and a pixel value determining procedure of determining the pixel value of each of the pixels. In the pixel value storing procedure, the pixel value of the pixel determined to have the pixel value acquired from the pixel value storing unit is stored in the pixel value storing unit. In the pixel value determining procedure, with regard to the pixel determined to have the pixel value acquired from the pixel value storing unit, a pixel value acquired from the pixel value storing unit is determined as the pixel value of the pixel. In the pixel value determining procedure, with regard to a pixel determined to have a pixel value not acquired from the pixel value storing unit, a predetermined value is determined as the pixel value of the pixel.

DESCRIPTION OF EMBODIMENT

Now, one embodiment of the present invention is described with reference to the drawings.

Figure 1:
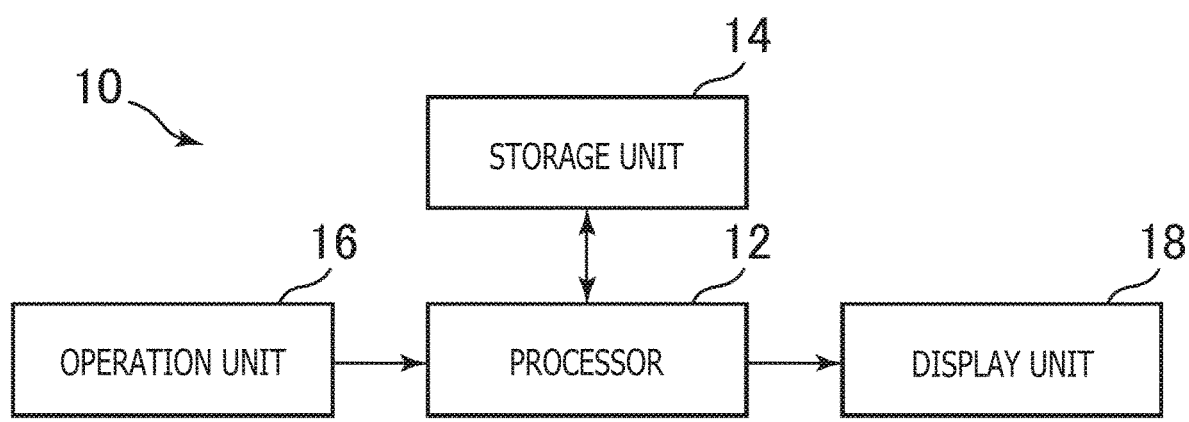
FIG. 1 is a diagram illustrating an example of the configuration of an image processing apparatus according to one embodiment of the present invention.

FIG. 1 is a diagram illustrating an example of the configuration of an image processing apparatus 10 according to the embodiment of the present invention. The image processing apparatus 10 according to the present embodiment is, for example, a game console, a handheld game console, or a personal computer. As illustrated in FIG. 1, the image processing apparatus 10 according to the present embodiment includes a processor 12, a storage unit 14, an operation unit 16, and a display unit 18.

The processor 12 is a program-controlled device such as a CPU (Central Processing Unit) and operates according to programs installed in the image processing apparatus 10. The processor 12 according to the present embodiment also includes a GPU (Graphics Processing Unit) configured to draw images in a frame buffer on the basis of graphic commands or data supplied from the CPU.

The storage unit 14 is a storage element such as a ROM (Read-Only Memory) or a RAM (Random-Access Memory), a hard disk drive, or the like. Further, the storage unit 14 according to the present embodiment has the frame buffer area in which images are drawn by the GPU.

The operation unit 16 is a keyboard, a mouse, a game console controller, or the like. The operation unit 16 receives operation input by a user and outputs a signal indicating the operation content to the processor 12.

The display unit 18 is a display device such as a liquid crystal display, and displays various images according to instructions from the processor 12. Further, the display unit 18 may be an HMD (Head Mounted Display).

Figure 2:
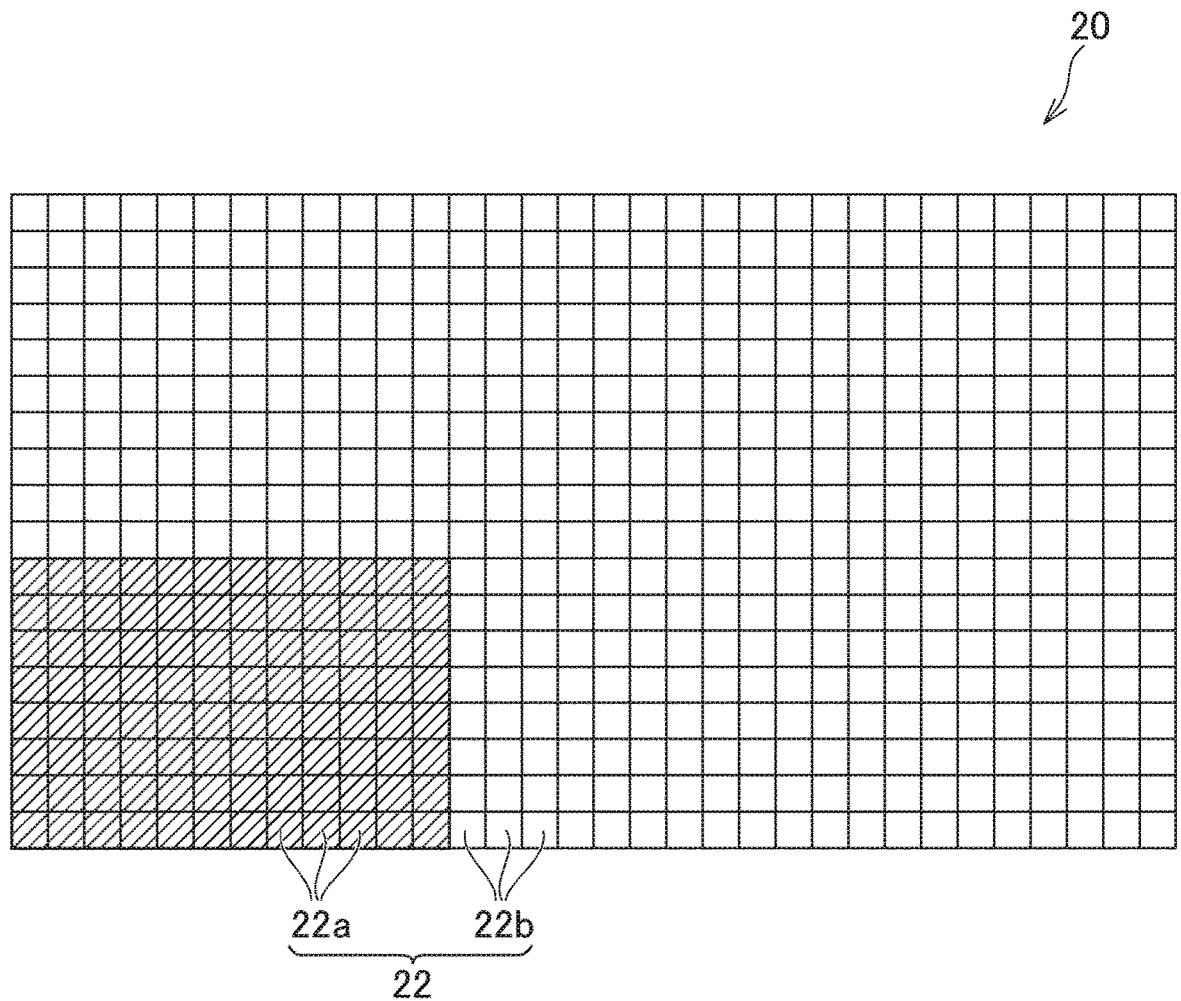
FIG. 2 is a diagram schematically illustrating an example of the data structure of acquisition management data associated with a foreground image.
Figure 3:
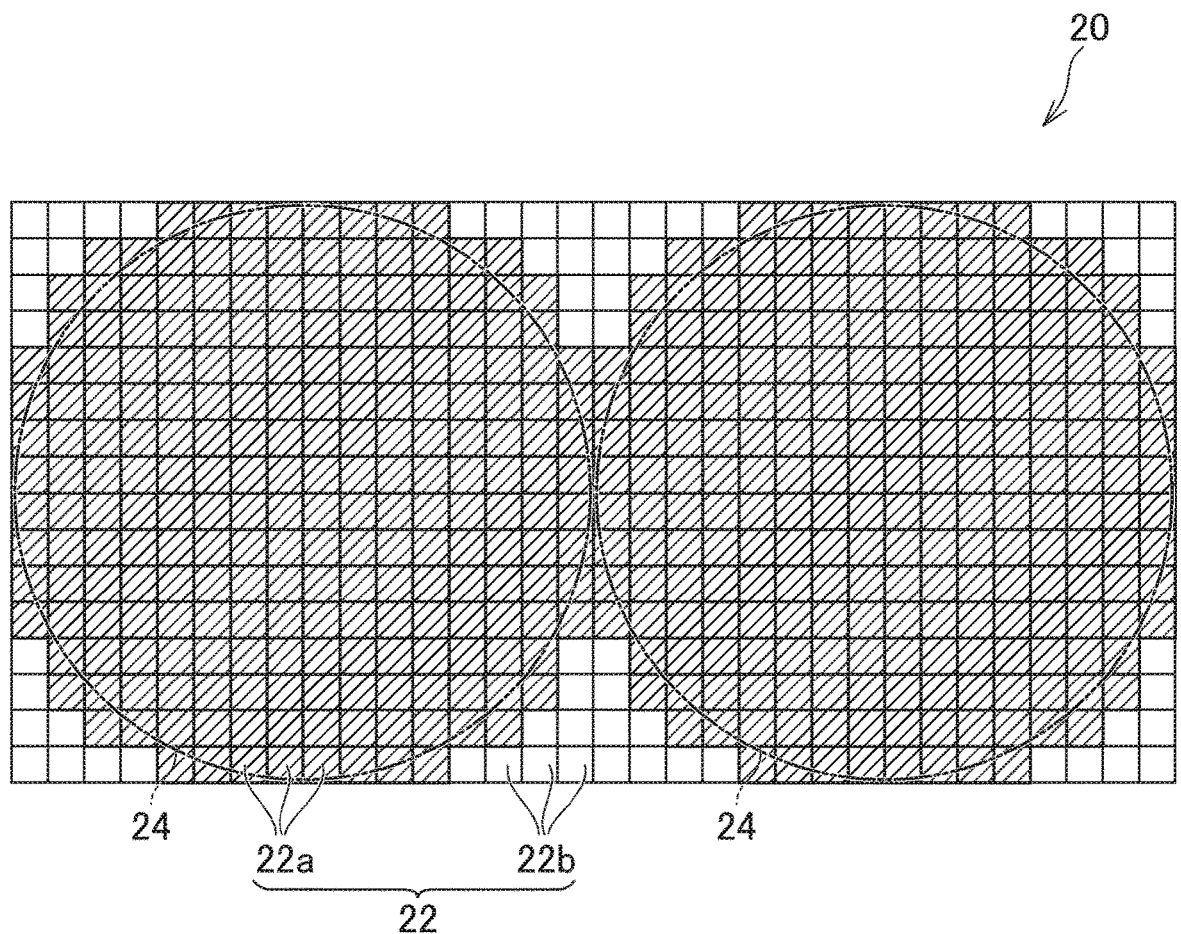
FIG. 3 is a diagram schematically illustrating an example of the data structure of acquisition management data associated with a three-dimensional image.

Now, there is described an example of how the storage capacity of the frame buffer for storing the pixel values of pixels included in images is saved in the image processing apparatus 10 according to the present embodiment with the use of acquisition management data 20 exemplified in FIG. 2 and FIG. 3.

FIG. 2 is a diagram schematically illustrating an example of the acquisition management data 20 according to the present embodiment.

Here, it is assumed, for example, that superimposed images in each of which a background image and a foreground image are superimposed on each other are generated at a predetermined frame rate (for example, every 1/60 seconds). Here, the background image may be, for example, a frame image representing a situation in a game being played that is obtained when a virtual three-dimensional object representing a game character placed in a virtual three-dimensional space is seen from a viewpoint in the virtual three-dimensional space. Further, the foreground image may be, for example, a frame image representing information regarding a user interface in the game. Here, the foreground image may be a frame image representing two-dimensional objects such as characters, shapes, or symbols. Further, the acquisition management data 20 illustrated in FIG. 2 is an example of the acquisition management data 20 associated with the foreground image.

For example, since a situation in a game being played that is obtained when a virtual three-dimensional object placed in a virtual three-dimensional space is seen from a viewpoint in the virtual three-dimensional space is often expressed by graphics, the blurred expression is very likely to be allowable to some extent. Meanwhile, when the resolution of a frame image in which two-dimensional objects such as characters, shapes, or symbols are arranged is low, the frame image is blurred, with the result that it is difficult for a user to read the content.

In view of this, in the following description, it is assumed, for example, that the resolution of the foreground image is higher than that of the background image. Further, it is assumed, for example, that the superimposed image is generated by resizing the background image to match the resolution of the foreground image and then superimposing the foreground image and the resized background image on each other. In the following description, it is assumed, for example, that the superimposed image is generated by executing alpha blending on the foreground image and the resized background image.

Further, in the description below, for example, in the storage unit 14, a frame buffer area in which the pixel values of background images are stored and a frame buffer area in which the pixel values and alpha values of foreground images are stored are individually provided. The frame buffer in which the pixel values of background images are stored is hereinafter referred to as a "background frame buffer," and the frame buffer in which the pixel values and alpha values of foreground images are stored is hereinafter referred to as a "foreground frame buffer."

Here, it is assumed, for example, that one pixel stored in the background frame buffer has a pixel value size of 24 bits. Further, it is assumed, for example, that one pixel stored in the foreground frame buffer has a pixel value size of 24 bits and an alpha value size of 8 bits. Thus, the storage capacity of the foreground frame buffer for storing the pixel value and alpha value of one pixel is 32 bits. Note that, the pixel value sizes of the red component, green component, and blue component of one pixel may each be 8 bits.

The acquisition management data 20 illustrated in FIG. 2 includes a plurality of pieces of individual acquisition management data 22. A piece of the individual acquisition management data 22 illustrated in FIG. 2 is associated with a pixel block obtained when the foreground image is divided into a plurality of pixel blocks each having a plurality of pixels belonging thereto. Here, it is assumed, for example, that the number of pixels belonging to one pixel block is 14,000, and a total of the pixel value sizes of the pixels belonging to the pixel block is 56 kilobytes.

Further, for example, the pixel block may be a plurality of pixels occupying a rectangular region in the foreground image. Further, each position of the individual acquisition management data 22 illustrated in FIG. 2, which is included in the acquisition management data 20, is associated with the position of the pixel block associated with the individual acquisition management data 22 in the foreground image.

The acquisition management data 20 illustrated in FIG. 2 is, for example, data indicating whether or not to acquire pixel values and alpha values from the foreground frame buffer. Here, for example, a piece of the individual acquisition management data 22 included in the acquisition management data 20 may be, for example, a flag of 1 bit indicating whether or not to acquire pixel values and alpha values from the foreground frame buffer. Further, for example, the individual acquisition management data 22 indicating that pixel values and alpha values are to be acquired from the foreground frame buffer may have a value of 1. Further, the individual acquisition management data 22 indicating that pixel values and alpha values are not to be acquired from the foreground frame buffer may have a value of 0.

The individual acquisition management data 22 having a value of 1 is hereinafter referred to as "first type individual acquisition management data 22a," and the individual acquisition management data 22 having a value of 0 is hereinafter referred to as "second type individual acquisition management data 22b." In the example of FIG. 2, the hatched individual acquisition management data 22 corresponds to the first type individual acquisition management data 22a, and the individual acquisition management data 22 without hatching corresponds to the second type individual acquisition management data 22b.

In the example of FIG. 2, it is assumed, for example, that a region in which the information regarding the user interface can be placed is set in advance in the foreground image by designers or the like, and it is determined in advance that a predetermined value such as a pixel value representing no color and full transparency is set to pixels outside the region. In such a case, for example, as illustrated FIG. 2, the first type individual acquisition management data 22a is set as the individual acquisition management data 22 associated with the region in which the information such as the user interface can be placed in the foreground image. In the example of FIG. 2, the first type individual acquisition management data 22a is set as the individual acquisition management data 22 associated with the lower left rectangular region. Further, the second type individual acquisition management data 22b is set as the individual acquisition management data 22 associated with pixels outside the rectangular region.

Here, in the example of FIG. 2, for example, with regard to the pixels associated with the first type individual acquisition management data 22a, an access is made to the foreground frame buffer storing the pixel values and alpha values of the pixels. Here, for example, with regard to 14,000 pixels associated with a piece of the first type individual acquisition management data 22a, an access is made to the foreground frame buffer storing the pixel value and alpha value of each of the 14,000 pixels. Then, the pixel value and alpha value of each of the 14,000 pixels are acquired. Consequently, with regard to the 14,000 pixels, the acquired pixel values and alpha values are determined as the pixel values and alpha values of the pixels.

Meanwhile, with regard to the pixels associated with the second type individual acquisition management data 22b, no access is made to the foreground frame buffer. Further, with regard to all the 14,000 pixels associated with the second type individual acquisition management data 22b, predetermined values are determined as the pixel values and alpha values of the pixels. Here, for example, pixel value and alpha value representing no color and full transparency may be determined as the pixel values and alpha values of the pixels. With this, in the pixels associated with the second type individual acquisition management data 22b, the content of the background image appears in the superimposed image.

FIG. 3 is a diagram schematically illustrating another example of the acquisition management data 20 according to the present embodiment.

Here, it is assumed, for example, that three-dimensional images are generated at a predetermined frame rate (for example, every 1/60 seconds). The three-dimensional image is, for example, a rectangular image including, to achieve stereopsis by the head mounted display including an optical system, a distortion-corrected left-eye image and a distortion-corrected right-eye image in the circular field-of-view range of the user's left eye and the circular field-of-view range of the user's right eye, respectively. Further, the acquisition management data 20 illustrated in FIG. 3 is an example of the acquisition management data 20 associated with the three-dimensional image.

The acquisition management data 20 illustrated in FIG. 3 includes a plurality of pieces of the individual acquisition management data 22. A piece of the individual acquisition management data 22 illustrated in FIG. 3 is associated with a pixel block obtained when the three-dimensional image is divided into a plurality of pixel blocks each having a plurality of pixels belonging thereto.

Further, for example, the pixel block may be a plurality of pixels occupying a rectangular region in the foreground image. Further, each position of the individual acquisition management data 22 illustrated in FIG. 3, which is included in the acquisition management data 20, is associated with the position of the pixel block associated with the individual acquisition management data 22 in the foreground image.

The acquisition management data 20 illustrated in FIG. 3 is, for example, data indicating whether or not to acquire pixel values from the frame buffer. Here, for example, a piece of the individual acquisition management data 22 included in the acquisition management data 20 may be, for example, a flag of 1 bit indicating whether or not to acquire pixel values from the frame buffer. Further, for example, the individual acquisition management data 22 indicating that pixel values are to be acquired from the frame buffer may have a value of 1. The individual acquisition management data 22 indicating that pixel values are not to be acquired from the frame buffer may have a value of 0.

Also in the example of FIG. 3, the individual acquisition management data 22 having a value of 1 is referred to as "first type individual acquisition management data 22a," and the individual acquisition management data 22 having a value of 0 is referred to as "second type individual acquisition management data 22b." Also in the example of FIG. 3, the hatched individual acquisition management data 22 corresponds to the first type individual acquisition management data 22a, and the individual acquisition management data 22 without hatching corresponds to the second type individual acquisition management data 22b.

Further, FIG. 3 illustrates two circular viewing regions 24 associated with the circular field-of-view range of the user's left eye and the circular field-of-view range of the user's right eye in the three-dimensional image. In the present embodiment, it is assumed, for example, that the viewing regions 24 are associated with given regions in the three-dimensional image. Further, in the example of FIG. 3, the second type individual acquisition management data 22b is set as the individual acquisition management data 22 associated with pixel blocks only including pixels outside the viewing regions 24. Further, the first type individual acquisition management data 22a is set as the individual acquisition management data 22 associated with pixel blocks including pixels that are partly or all in the viewing region 24.

In the example of FIG. 3, with regard to the pixels associated with the first type individual acquisition management data 22a, an access is made to the frame buffer storing the pixel values of the pixels. Here, for example, with regard to a plurality of pixels associated with a piece of the first type individual acquisition management data 22a, an access is made to the frame buffer storing the pixel value of each of the plurality of pixels. Then, with regard to each of the plurality of pixels, the pixel value of the pixel is acquired. Then, with regard to the plurality of pixels, the acquired pixel values are determined as the pixel values of the pixels.

Meanwhile, with regard to the pixels associated with the second type individual acquisition management data 22b, no access is made to the frame buffer storing the pixel values of the pixels. With regard to the pixels, a predetermined value is determined as the pixel values of the pixels. Here, for example, a pixel value representing black may be determined as the pixel values of the pixels. With this, the regions outside the viewing regions 24 are black in the three-dimensional image.

In the three-dimensional image, it is determined in advance that, as the pixel values of the pixels in the regions outside the circular field-of-view ranges, a predetermined value such as the pixel value representing black is set. Thus, with regard to the pixels associated with the second type individual acquisition management data 22b associated with the pixel blocks only including the pixels outside the viewing regions 24 as described above, the pixel value representing black is determined as the pixel values of the pixels without problem.

In the present embodiment, both in the acquisition management data 20 illustrated in FIG. 2 and in the acquisition management data 20 illustrated in FIG. 3, the storage capacity of the frame buffer for storing the pixel values of the pixels associated with the first type individual acquisition management data 22a is secured. Meanwhile, the storage capacity of the frame buffer for storing the pixel values of the pixels associated with the second type individual acquisition management data 22b is not secured. Further, in the present embodiment, for example, the region in the storage unit 14 that corresponds to the storage capacity of the frame buffer for storing the pixel values of the pixels associated with the second type individual acquisition management data 22b can be used for purposes other than as the frame buffer, for example.

Note that, the acquisition management data 20 itself may be stored in the region secured as the frame buffer in the storage unit 14, or may be stored outside the region secured as the frame buffer in the storage unit 14.

As described above, according to the present embodiment, the storage capacity of the frame buffer for storing the pixel values of pixels determined in advance to have a predetermined value as their pixel values can be saved. For example, in the example described with reference to FIG. 2, as compared to a case where the pixel values and alpha values of all pixels included in a foreground image are stored in a foreground frame buffer, the size of the region secured as the foreground frame buffer in the storage unit 14 can be saved. Further, for example, in the example described with reference to FIG. 3, as compared to a case where the pixel values of all pixels included in a three-dimensional image are stored in a frame buffer, the size of the region secured as the frame buffer in the storage unit 14 can be saved.

Note that, although the storage unit 14 needs the storage capacity for storing the acquisition management data 20, the storage capacity of the storage unit 14 necessary for storing the acquisition management data 20 is smaller than the storage capacity of the storage unit 14 necessary for storing pixel values. Thus, even though the acquisition management data 20 is stored in the region secured as the frame buffer in the storage unit 14, the storage capacity of the frame buffer can be saved as a whole.

Further, for example, in the example described with reference to FIG. 2, only the pixel values may be stored in the foreground frame buffer, and the alpha values may not be stored. Further, in this case, for example, the superimposed image may be generated by overwriting the foreground image on the resized background image.

Now, the functions of the image processing apparatus 10 according to the present embodiment and processing that the image processing apparatus 10 according to the present embodiment executes are further described with a focus on pixel value determination using the acquisition management data 20.

Figure 4:
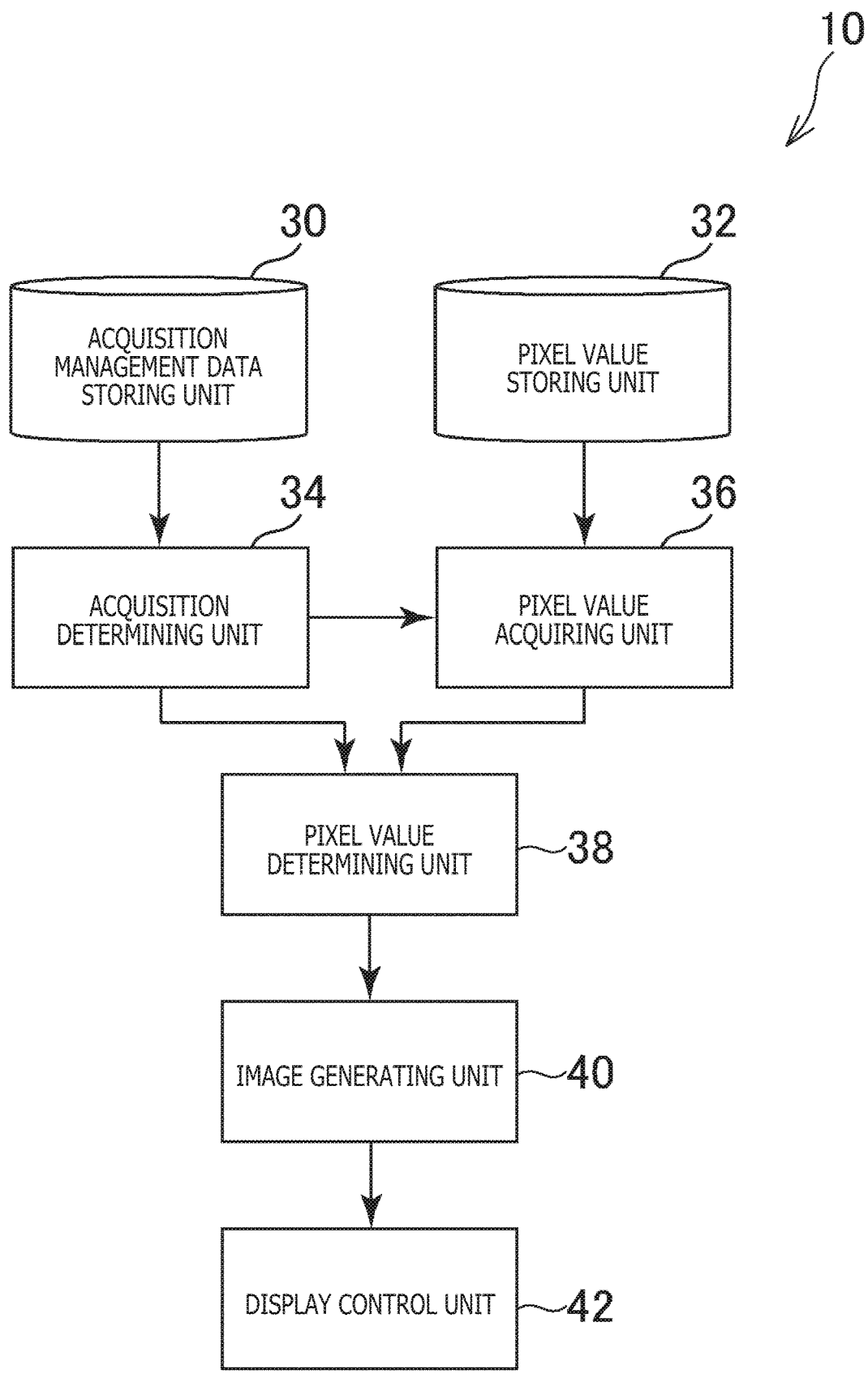
FIG. 4 is a functional block diagram illustrating an example of functions of the image processing apparatus according to the embodiment of the present invention.

FIG. 4 is a functional block diagram illustrating an example of functions that are implemented on the image processing apparatus 10 according to the present embodiment. Note that, on the image processing apparatus 10 according to the present embodiment, all the functions illustrated in FIG. 4 are not necessarily implemented, and functions other than the functions illustrated in FIG. 4 may be implemented.

As illustrated in FIG. 4, the image processing apparatus 10 functionally includes, for example, an acquisition management data storing unit 30, a pixel value storing unit 32, an acquisition determining unit 34, a pixel value acquiring unit 36, a pixel value determining unit 38, an image generating unit 40, and a display control unit 42. The acquisition management data storing unit 30 and the pixel value storing unit 32 are implemented mainly with the storage unit 14. The acquisition determining unit 34, the pixel value acquiring unit 36, the pixel value determining unit 38, and the image generating unit 40 are implemented mainly with the processor 12. The display control unit 42 is implemented mainly with the processor 12 and the display unit 18. The image processing apparatus 10 plays a role of an image generating apparatus configured to generate images in the present embodiment.

The above-mentioned functions may be implemented by the processor 12 executing a program that is installed in the image processing apparatus 10, which is a computer, and includes instructions corresponding to the above-mentioned functions. The program may be supplied to the image processing apparatus 10 through a computer-readable information storage medium such as an optical disc, a magnetic disk, a magnetic tape, a magneto-optical disk, or a flash memory, or through the Internet or the like.

The acquisition management data storing unit 30 stores the acquisition management data 20 indicating whether or not to acquire, from the pixel value storing unit 32, the pixel value of each pixel included in an image in the present embodiment, for example.

Here, the acquisition management data 20 may include a plurality of pieces of the individual acquisition management data 22 each associated with a plurality of pixels. Further, as described with reference to FIG. 2, the individual acquisition management data 22 may be associated with a plurality of pixels occupying a rectangular region in an image. In the examples of FIG. 2 and FIG. 3, a piece of the individual acquisition management data 22 is associated with the plurality of pixels (pixel block) in the rectangular region in the image. Note that, a piece of the individual acquisition management data 22 may be associated with one pixel.

Further, the acquisition management data 20 may indicate that the pixel values of pixels occupying a given region in an image are not to be acquired from the pixel value storing unit 32. For example, as in the example of FIG. 2, the individual acquisition management data 22 associated with pixels occupying a given region outside a region in which two-dimensional objects can be arranged may indicate that no access is to be made to the pixel value storing unit 32. Further, for example, as in the example of FIG. 3, the individual acquisition management data 22 associated with pixels occupying given regions outside given circular field-of-view ranges associated with the viewing regions 24 may indicate that no access is to be made to the pixel value storing unit 32.

The pixel value storing unit 32 stores pixel values in the present embodiment, for example. Here, for example, the pixel value storing unit 32 may store the pixel values of pixels determined by the acquisition determining unit 34 to have pixel values acquired from the pixel value storing unit 32.

Further, the pixel value storing unit 32 may store the pixel values and alpha values of pixels determined to have pixel values acquired from the pixel value storing unit 32.

Further, in the present embodiment, for example, the storage capacity of the frame buffer for storing the pixel values of pixels determined to have pixel values not acquired from the pixel value storing unit 32 is not secured in the pixel value storing unit 32.

For example, the region secured as the foreground frame buffer for storing the pixel values and alpha values of the pixels in the foreground image described with reference to FIG. 2 or as the frame buffer for storing the pixel values of the pixels in the three-dimensional image described with reference to FIG. 3 corresponds to the pixel value storing unit 32.

The acquisition determining unit 34 determines, on the basis of the acquisition management data 20, whether or not to acquire the pixel value of each pixel included in an image from the pixel value storing unit 32 in the present embodiment, for example. Here, the acquisition determining unit 34 may determine, on the basis of the individual acquisition management data 22, whether or not to acquire the pixel values of a plurality of pixels associated with the individual acquisition management data 22 from the pixel value storing unit 32. For example, it may be determined that the pixel values of pixels associated with the first type individual acquisition management data 22a are acquired from the pixel value storing unit 32. Further, it may be determined that the pixel values of pixels associated with the second type individual acquisition management data 22b are not acquired from the pixel value storing unit 32.

The pixel value acquiring unit 36 acquires, from the pixel value storing unit 32, the pixel values of pixels determined to have pixel values acquired from the pixel value storing unit 32 in the present embodiment, for example.

The pixel value determining unit 38 determines the pixel value of each pixel included in an image in the present embodiment, for example. Here, for example, the pixel value determining unit 38 determines, with regard to pixels determined to have pixel values acquired from the pixel value storing unit 32, pixel values acquired from the pixel value storing unit 32 as the pixel values of the pixels. Further, the pixel value determining unit 38 determines, for example, with regard to pixels determined to have pixel values not acquired from the pixel value storing unit 32, a predetermined value as the pixel values of the pixels.

Here, the pixel value determining unit 38 may determine pixel values and alpha values. For example, with regard to pixels determined to have pixel values acquired from the pixel value storing unit 32, pixel values and alpha values acquired from the pixel value storing unit 32 may be determined as the pixel values and alpha values of the pixels. Further, for example, with regard to pixels determined to have pixel values not acquired from the pixel value storing unit 32, predetermined values may be determined as the pixel values and alpha values of the pixels. In the example described with reference to FIG. 2, the predetermined values are the pixel value and alpha value representing no color and full transparency. Further, in the example described with reference to FIG. 3, the predetermined value is the pixel value representing black.

Further, the pixel value determining unit 38 may determine, with regard to all of a plurality of pixels associated with the second type individual acquisition management data 22b, which are determined to have pixel values not acquired from the pixel value storing unit 32, a predetermined value as the pixel values of the plurality of pixels. Here, with regard to all of the plurality of pixels associated with the second type individual acquisition management data 22b, predetermined values may be determined as the pixel values and alpha values of the plurality of pixels.

The image generating unit 40 generates images based on pixel values determined by the pixel value determining unit 38 in the present embodiment, for example. Here, the image generating unit 40 may generate a superimposed image by superimposing an image having pixel values and alpha values determined by the pixel value determining unit 38 and another image on each other. For example, as described with reference to FIG. 2, the image generating unit 40 may generate a superimposed image by superimposing a foreground image having pixel values determined by the pixel value determining unit 38 and a background image having pixels with pixel values stored in the background frame buffer on each other. Further, a superimposed image may be generated by superimposing a foreground image and a resized background image on each other.

Further, for example, the pixel value determining unit 38 may determine the pixel value of each pixel included in a superimposed image. Here, for example, alpha blending based on the alpha values of pixels in the foreground image may be executed. For example, on the basis of the alpha values of pixels included in a foreground image, of the pixel values of the pixels, and of the pixel values of pixels in a background image that are associated with the pixels in question, the pixel values of pixels in a superimposed image that are associated with the pixels in question may be determined. Then, the image generating unit 40 may generate the superimposed image on the basis of the thus determined pixel values.

Further, as described with reference to FIG. 3, the image generating unit 40 may generate three-dimensional images.

The display control unit 42 controls the display unit 18 to display images generated by the image generating unit 40 in the present embodiment, for example. Here, for example, the superimposed image described with reference to FIG. 2 may be displayed on the display. Further, for example, the three-dimensional image described with reference to FIG. 3 may be displayed on the HMD.

Figure 5:
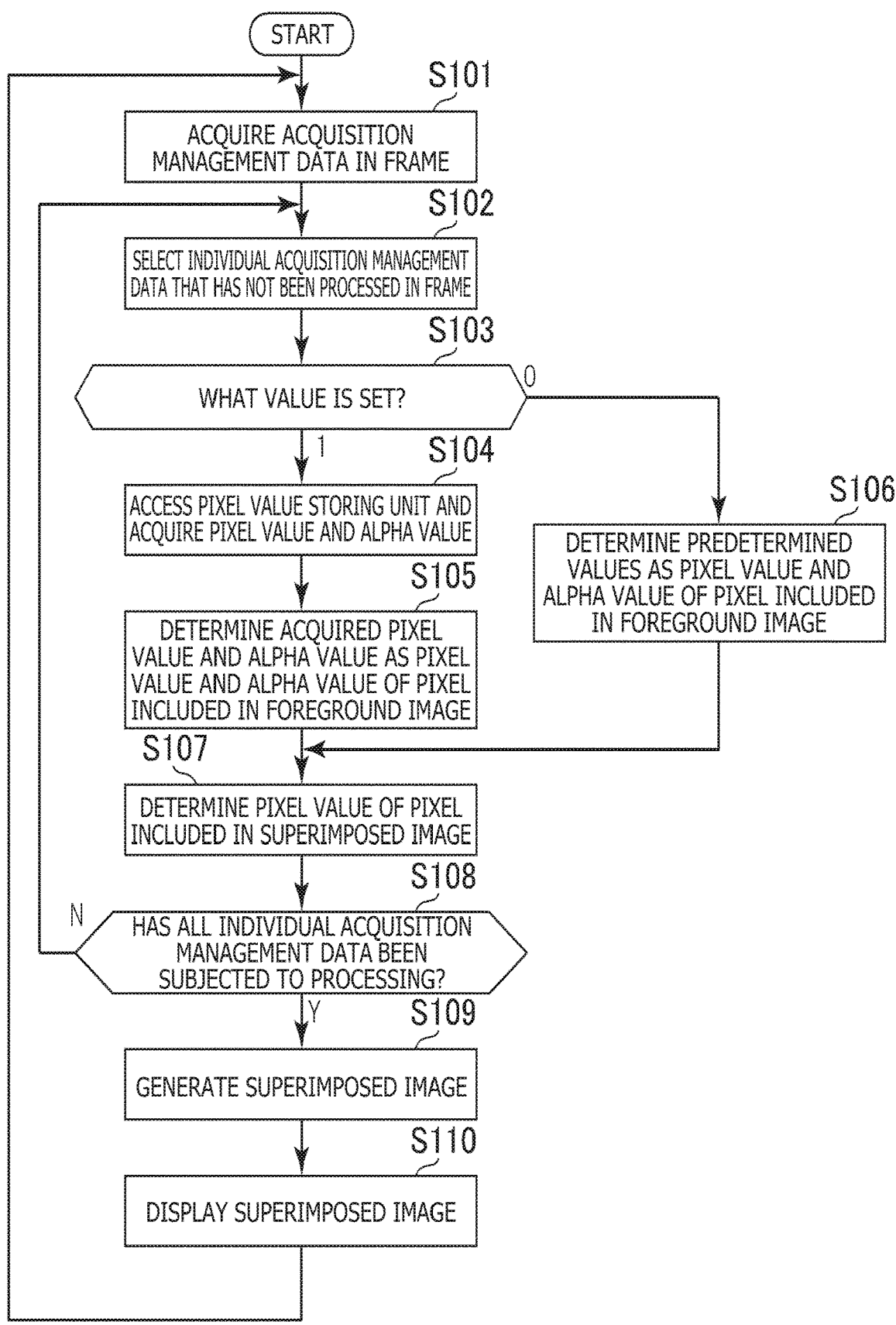
FIG. 5 is a flow chart illustrating an example of the flow of processing that the image processing apparatus according to the embodiment of the present invention performs.

Here, an example of the flow of processing that the image processing apparatus 10 according to the present embodiment performs is described with reference to the flow chart of FIG. 5. The processing to be described in the present processing example corresponds to the example described with reference to FIG. 2.

Note that, in the present processing example, it is assumed that, at a predetermined frame rate, the acquisition management data 20 in the frame is stored in the acquisition management data storing unit 30. Further, in the present processing example, it is assumed that, at the predetermined frame rate, the pixel values of a background image in the frame are stored in the background frame buffer. Further, it is assumed that, at the predetermined frame rate, the pixel values and alpha values of pixels in a foreground image that are associated with the first type individual acquisition management data 22a in the frame are stored in the foreground frame buffer.

First, the acquisition determining unit 34 acquires, from the acquisition management data storing unit 30, the acquisition management data 20 in the frame (S101).

Then, the acquisition determining unit 34 selects, from the individual acquisition management data 22 included in the acquisition management data 20 acquired in the processing of S101, a piece of the individual acquisition management data 22 not subjected to the processing of S103 to S107 in the frame (S102).

Then, the acquisition determining unit 34 confirms a value set to the individual acquisition management data 22 selected in the processing of S102 (S103).

Here, it is assumed that it is confirmed that the value is 1. That is, it is confirmed that the individual acquisition management data 22 is the first type individual acquisition management data 22a. In this case, the pixel value acquiring unit 36 accesses the pixel value storing unit 32 to acquire the pixel value and alpha value of each of a plurality of pixels belonging to a pixel block associated with the first type individual acquisition management data 22a (S104).

Then, the pixel value determining unit 38 determines, with regard to each of the plurality of pixels belonging to the pixel block, the pixel value and alpha value of the pixel acquired in the processing of S104 as the pixel value and alpha value of the pixel included in the foreground image (S105).

Meanwhile, it is assumed that it is confirmed in the processing of S103 that the value is 0. That is, it is confirmed that the individual acquisition management data 22 is the second type individual acquisition management data 22b. In this case, the pixel value determining unit 38 determines, with regard to all pixels belonging to a pixel block associated with the second type individual acquisition management data 22b, predetermined values as the pixel values and alpha values of the pixels included in the foreground image (S106). Here, for example, as the pixel values and alpha values of the pixels, the pixel value and alpha value representing no color and full transparency are determined.

Then, the pixel value determining unit 38 determines the pixel values of a plurality of pixels in a superimposed image that are associated with the plurality of pixels belonging to the pixel block (S107). Here, for example, the pixel values of the pixels in the superimposed image may be determined, on the basis of the pixel values and alpha values of the pixels included in the foreground image and determined in the processing of S105 or S106 and the pixel values of the pixels in the background image that are associated with the pixels in question.

Then, the pixel value determining unit 38 confirms whether or not all the individual acquisition management data 22 in the frame has been subjected to the processing of S103 to S107 (S108).

In a case where all the individual acquisition management data 22 in the frame has not been subjected to the processing of S103 to S107 (S108: N), the processing returns to the processing of S102.

In a case where all the individual acquisition management data 22 in the frame has been subjected to the processing of S103 to S107 (S108: Y), the image generating unit 40 generates the superimposed image in the frame (S109). Here, for example, the superimposed image is generated on the basis of the pixel values determined in the processing of S107.

Then, the display control unit 42 controls the display unit 18 to display the superimposed image generated in the processing of S109 (S110), and the processing returns to the processing of S101.

In the present processing example, the processing of S101 to S110 is repeatedly executed at the predetermined frame rate.

Note that, in the above-mentioned processing example, the acquisition management data 20 in the frame may not be stored in the acquisition management data storing unit 30 at the predetermined frame rate. For example, the acquisition management data 20 common to all frames may be used. In this case, when the processing of S110 ends, the processing may return to the processing of S102 and processing for a next frame may be executed.

Figure 6:
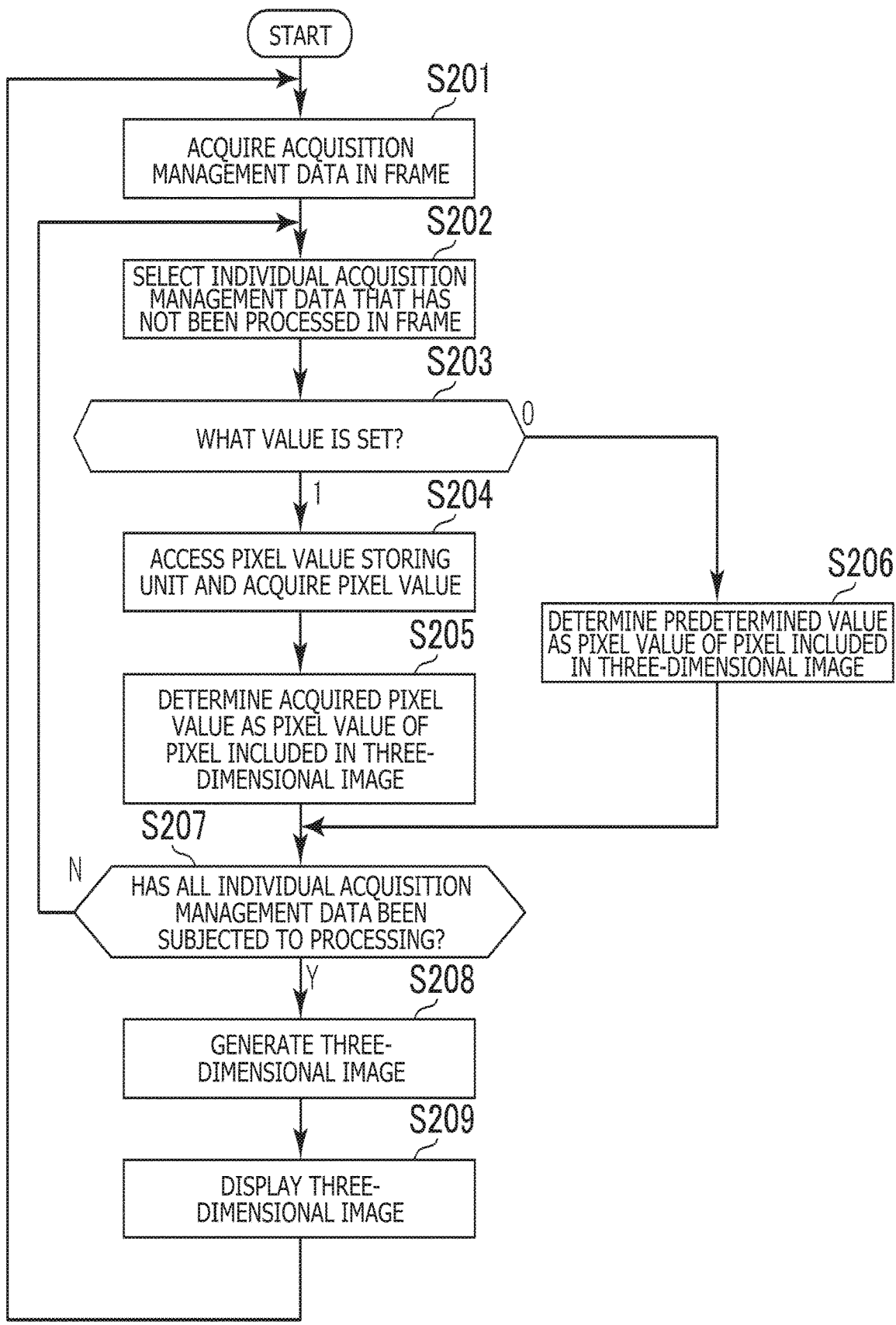
FIG. 6 is a flow chart illustrating an example of the flow of processing that the image processing apparatus according to the embodiment of the present invention performs.

Next, another example of the flow of processing that the image processing apparatus 10 according to the present embodiment performs is described with reference to the flow chart of FIG. 6. The processing to be described in the present processing example corresponds to the example described with reference to FIG. 3.

Note that, in the present processing example, it is assumed that, at a predetermined frame rate, the acquisition management data 20 in the frame is stored in the acquisition management data storing unit 30. Further, in the present processing example, it is assumed that, at the predetermined frame rate, the pixel values of pixels in a three-dimensional image that are associated with the first type individual acquisition management data 22a in the frame are stored in the frame buffer.

First, the acquisition determining unit 34 acquires, from the acquisition management data storing unit 30, the acquisition management data 20 in the frame (S201).

Then, the acquisition determining unit 34 selects, from the individual acquisition management data 22 included in the acquisition management data 20 acquired in the processing of S201, a piece of the individual acquisition management data 22 not subjected to the processing of S203 to S206 in the frame (S202).

Then, the acquisition determining unit 34 confirms a value set to the individual acquisition management data 22 selected in the processing of S202 (S203).

Here, it is assumed that it is confirmed that the value is 1. That is, it is confirmed that the individual acquisition management data 22 is the first type individual acquisition management data 22a. In this case, the pixel value acquiring unit 36 accesses the pixel value storing unit 32 to acquire the pixel value of each of a plurality of pixels belonging to a pixel block associated with the first type individual acquisition management data 22a (S204).

Then, the pixel value determining unit 38 determines, with regard to each of the plurality of pixels belonging to the pixel block, the pixel value of the pixel acquired in the processing of S204 as the pixel value of the pixel included in the three-dimensional image (S205).

Meanwhile, it is assumed that it is confirmed in the processing of S203 that the value is 0. That is, it is confirmed that the individual acquisition management data 22 is the second type individual acquisition management data 22b. In this case, the pixel value determining unit 38 determines, with regard to all pixels belonging to a pixel block associated with the second type individual acquisition management data 22b, a predetermined value as the pixel values of the pixels included in the three-dimensional image (S206). Here, for example, as the pixel values of the pixels, the pixel value representing black is determined.

Then, the pixel value determining unit 38 confirms whether or not all the individual acquisition management data 22 in the frame has been subjected to the processing of S203 to S206 (S207).

In a case where all the individual acquisition management data 22 in the frame has not been subjected to the processing of S203 to S206 (S207: N), the processing returns to the processing of S202.

In a case where all the individual acquisition management data 22 in the frame has been subjected to the processing of S203 to S206 (S207: Y), the image generating unit 40 generates the three-dimensional image in the frame (S208). Here, for example, the three-dimensional image is generated on the basis of the pixel values determined in the processing of S205 or S206.

Then, the display control unit 42 controls the display unit 18 to display the three-dimensional image generated in the processing of S208 (S209), and the processing returns to the processing of S201.

In the present processing example, the processing of S201 to S209 is repeatedly executed at the predetermined frame rate.

Note that, in the above-mentioned processing example, at the predetermined frame rate, the acquisition management data 20 in the frame may not be stored in the acquisition management data storing unit 30. For example, the acquisition management data 20 common to all frames may be used. In this case, when the processing of S209 ends, the processing may return to the processing of S202 and processing for a next frame may be executed.

Note that, the present invention is not limited to the embodiment described above.

Further, the specific character strings and the numerical values in the foregoing description and in the drawings are only examples, and the present invention is not limited thereto.

The invention claimed is:

1. An image generating apparatus comprising:
a pixel value storing unit configured to store pixel values and alpha values;
an acquisition management data storing unit configured to store acquisition management data for a plurality of frame images and indicates whether or not to use one or more of the pixels values from the pixel value storing unit in the frame images;
an acquisition determining unit configured to determine, based on the acquisition management data, whether or not to acquire the one or more of the pixels values from the pixel value storing unit for use in the frame images;
a pixel value acquiring unit configured to obtain the one or more of the pixels values from the pixel value storing unit;
a pixel value determining unit configured to determine whether to use the one or more pixel values and one or more of the alpha values from the pixel value storing unit, or to use one or more predetermined pixel values and one or more predetermined alpha values, in the frame images; and
an image generating unit configured to generate a superimposed image by superimposing one or more of the frame images having the one or more pixel values and the one or more alpha values determined by the pixel value determining unit and another image on each other.

2. The image generating apparatus according to claim 1, wherein the acquisition management data includes a plurality of pieces of individual acquisition management data each associated with a respective one of a plurality of sets of the pixel values in the pixel value storing unit, the acquisition determining unit determines, based on the individual acquisition management data, whether or not to acquire the respective sets of the pixel values associated with the individual acquisition management data from the pixel value storing unit, and the pixel value determining unit determines whether to use the respective sets of pixel values from the pixel value storing unit, or to use predetermined pixel values, in the frame images.

3. The image generating apparatus according to claim 2, wherein each of the individual acquisition management data is associated with a respective rectangular region in the frame images.

4. The image generating apparatus according to claim 1, wherein the acquisition management data indicates that a pixel value of a pixel occupying a given region in the frame image is not to be acquired from the pixel value storing unit.

5. An image generating method comprising:
   storing pixel values and alpha values in a pixel value storing unit;
   storing acquisition management data for a plurality of frame images in an acquisition management data storing unit, where the acquisition management data indicates whether or not to use one or more of the pixels values from the pixel value storing unit in the frame images;
   determining, based on the acquisition management data, whether or not to acquire the one or more of the pixels values from the pixel value storing unit for use in the frame images;
   obtaining the one or more of the pixels values from the pixel value storing unit
   determining whether to use the one or more pixel values and one or more of the alpha values from the pixel value storing unit, or to use one or more predetermined pixel values and one or more predetermined alpha values, in the frame images; and
   generating a superimposed image by superimposing one or more of the frame images having the one or more pixel values and the one or more alpha values determined by the pixel value determining unit and another image on each other.

6. A non-transitory, computer readable storage medium containing a program, which when executed by a computer, causes the computer to conduct an image generating method by carrying out actions, comprising:
   storing pixel values and alpha values in a pixel value storing unit;
   storing acquisition management data for a plurality of frame images in an acquisition management data storing unit, where the acquisition management data indicates whether or not to use one or more of the pixels values from the pixel value storing unit in the frame images;
   determining, based on the acquisition management data, whether or not to acquire the one or more of the pixels values from the pixel value storing unit for use in the frame images;
   obtaining the one or more of the pixels values from the pixel value storing unit;
   determining whether to use the one or more pixel values and one or more of the alpha values from the pixel value storing unit, or to use one or more predetermined pixel values and one or more predetermined alpha values, in the frame images; and
   generating a superimposed image by superimposing one or more of the frame images having the one or more pixel values and the one or more alpha values determined by the pixel value determining unit and another image on each other.

\* \* \* \* \*